United States Patent
Sriram et al.

(10) Patent No.: US 6,654,419 B1
(45) Date of Patent: Nov. 25, 2003

(54) BLOCK-BASED, ADAPTIVE, LOSSLESS VIDEO CODER

(75) Inventors: Parthasarathy Sriram, San Jose, CA (US); Subramania Sudharsanan, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/561,299

(22) Filed: Apr. 28, 2000

(51) Int. Cl.$^7$ .................................................. H04N 7/18
(52) U.S. Cl. ........................... 375/240.12; 375/240.13; 375/240.14
(58) Field of Search ................................. 382/250, 235, 382/239; 375/240.1–240.2, 240.03, 240.24–240.29

(56) References Cited

U.S. PATENT DOCUMENTS

| | | | | |
|---|---|---|---|---|
| 5,835,034 A | * | 11/1998 | Seroussi et al. | 341/65 |
| 5,959,674 A | * | 9/1999 | Jang et al. | 375/240.2 |
| 6,173,080 B1 | * | 1/2001 | Cho et al. | 382/250 |
| 6,341,144 B1 | * | 1/2002 | Haskell et al. | 375/240.2 |
| 6,385,251 B1 | * | 5/2002 | Talluri et al. | 361/306.3 |
| 6,466,620 B1 | * | 10/2002 | Lee | 375/240.03 |

* cited by examiner

*Primary Examiner*—Andy Rao
(74) *Attorney, Agent, or Firm*—Martine & Penilla, LLP

(57) ABSTRACT

Method and system for compression coding of a digitally represented video image. The video image is expressed as one or more data blocks in two or more frames, each block having a sequence of pixels with pixel values. Within each block of a frame, an intra-frame predictor index or inter-frame predictor index is chosen that predicts a pixel value as a linear combination of actual pixel values, drawn from one frame or from two or more adjacent frames. The predicted and actual pixel values are compared, and twice the predicted value is compared with the sum of the actual value and a maximum predicted value, to determine a value index, which is used to represent each pixel value in a block in compressed format in each frame. The compression ratios achieved by this coding approach compare favorably with, and may improve upon, the compression achieved by other compression methods. Several processes in determination of the compressed values can be performed in parallel to increase throughput or to reduce processing time.

17 Claims, 10 Drawing Sheets

BLOCK-BASED, ADAPTIVE, LOSSLESS VIDEO CODER

FIELD OF THE INVENTION

This invention relates to selective compression of digital video images.

BACKGROUND OF THE INVENTION

Compression of digital video images using lossless schemes is a new area of research for video applications. Recent advances in digital electronics and electromechanics are helping to promote use of digital video images. The algorithms for lossy compression (or coding) of video images have become sophisticated, spurred by the applications and standardization activities for moving pictures or images, such as the ISO MPEG-1 and MPEG-2 standards and the ITU H.261/H.263 standards. The corresponding lossless compression approaches have received relatively little attention thus far, due to the higher computation requirements and to the generally lower compression efficiency for lossless compression of video image sequences.

Almost all known video coders have inherited some techniques from static or still image coders. For example, MPEG-1 and the H.261, the first moving picture standards to be developed, used techniques such as Huffman coding, discrete coding transform, run-length coding and other techniques that are similar to those developed for JPEG intra-frame coding of independent frames. The compression performance of lossless static image coders was not sufficient to form a basis for a lossless, video image sequence coder.

Recently, several lossless image coders have been proposed that have relatively good compression performance. The majority of these new techniques use sophisticated entropy-coding and statistical modeling of the source data in a pixel-by-pixel approach. These approaches are very cumbersome to implement and are much less efficient when encoded as software implemented on a digital signal processor (DSP) or on a general purpose microprocessor.

What is needed is a block-based video image compression approach that reduces the computational complexity but retains many of the attractive features of the most flexible video compression approaches. Preferably, the approach should allow selective uses of lossless compression and lossy compression for different portions of the same image in a video sequence, without substantially increasing the complexity that is present when only lossless compression or only lossy compression is applied to a video image. Preferably, the approach should allow use of pixel value information from an adjacent frame (preceding or following) to provide predicted pixel values for the present frame. Preferably, the approach should allow use of parallel processing to reduce the time required for, or to increase the throughput of, a conventional video coding approach.

SUMMARY OF THE INVENTION

These needs are met by the invention, which provides a block-based video image coder that permits multiple levels of parallel implementation. The pixels in each input block of an image in a frame of a video sequence are coded intra-frame using a differential pulse code modulation (DPCM) scheme that uses one of several selectable predictors. The invention uses a block-based, intra-frame image coding approach that provides lossless compression coding for an image in a single frame. This intra-frame coding approach is disclosed in a related patent application for a "Block-Based, Adaptive, Lossless Image Coder", U.S. Ser. No. 09/xxx,xxx.

The predictor for a block is chosen using local characteristics of the block to be coded. Prediction residuals (difference between actual and predicted values) are mapped to a non-negative integer scale and are coded using a new entropy-coded mechanism based on a modified Golomb Code (MGC). In addition, a novel run-length encoding scheme is used to encode specific patterns of zero runs. The invention permits parallel processing of data blocks and allows flexibility in ordering the blocks to be processed.

Some inter-frame prediction is also available so that frame-to-frame changes can be accounted for. The invention uses a motion vector to relate, by a linear transformation (translation, rotation, scale factor change, etc.), a pixel value (or block thereof) in an adjacent frame to a pixel value (or block thereof) in the present frame.

A block of pixels is examined to determine if each of the pixel values for the present frame is the same as the value of the corresponding pixel for the preceding frame. If so, this block of pixel values for the present is predictable by the pixel values already received for the same block for the preceding frame. If not, the system determines if all pixels in this block have one value (dc-only block). If so, a dc-only block uses a selected predictor and is easily compressed for later use. A non-dc block is examined according to selected criteria, and an optimal predictor is selected for this block.

This predictor includes an intra-frame component and an inter-frame component. A residual value (actual value minus predicted value) is computed and clamped, and the block of clamped values and corresponding predictor index are processed for compression, using an efficient mapping that takes advantage of the full dynamic range of the clamped residual values.

Context modeling can be included here without substantially increasing the computational complexity, by making the context switch granularity depend upon a "block" of pixels (e.g., P×Q), rather than on a single pixel, to allow inclusion of a transition region where a switch occurs. In some imaging applications, combinations of lossless and lossy techniques are combined to compress an image. For example, a portion of the image corresponding to a majority of text information might have to be losslessly coded, while the portion of the image with continuous-tone gray-scale information can be coded with some visual distortion to obtain higher compression. In such applications, the input image is segmented to identify the regions to be losslessly coded. Accordingly, lossy coders and lossless coders are switched on and off region-by-region within a frame. However, many of the lossy and lossless coders may work only on an entire frame. The "chunking" by the segmentation algorithm makes it inefficient to code small blocks using the existing methods.

For video image encoding, use of a block-based coding scheme offers an additional advantage where inter-frame image processing is important. It is common practice in video image sequence encoding to segment a frame into rectangular regions and to determine if a close match exists between a given block in the present frame and a prediction block that was estimated using previously reconstructed data from an adjacent frame. When a close match occurs between actual and predicted pixel values for such a rectangular region, a vector is transmitted to the coder as a portion of the bitstream, specifying the addresses of this region in the reference frame that were used to compute the predicted pixel values. This approach, commonly referred to as "motion estimation" in the video literature, achieves good video compression by utilizing pixel value correlation between adjacent frames. Although it may be possible to modify a pixel-based scheme to utilize such a correlation, this modified scheme will not be computationally efficient, and additional bits will be needed to transmit the motion data for each pixel.

Using an inter-frame processing technique, a block of pixel values in a present frame is compared with a corresponding block of predicted pixel values in an adjacent or reference frame (preceding or following); and if a match occurs, the corresponding block of predicted pixel values is used to predict the pixel values of the block from the present frame; this may be implemented by use of a single bit or flag, indicating that such a match occurs, and the intra-frame coding component can be skipped for this frame. If no match occurs, a combination of an inter-frame coding component and an intra-frame coding component is used for compression coding.

This approach also allows use of parallel processing of two or more blocks of pixel values, within a single frame or within adjacent frames, in order to reduce the time required for processing a frame, or to increase the throughput of processing pixel values for one or more frames.

The approach disclosed here is applicable to natural, synthetic, graphic and computer-generated image sequences that may change from one frame to the next. A context switch at the block level scan be adapted for lossy coding. Thus, one obtains a single coder format that fits both lossy and lossless cases and encompasses a video image segmenter as well.

DESCRIPTION OF THE INVENTION

An image can be represented as a rectangular array of P×Q blocks of pixels, each of which may contain text, graphics, natural images, etc. The rectangular image to be coded is split into a multiple of P×Q blocks of images, where P and Q may, but need not, coincide. Each block is first evaluated to determine if each pixel in the block in the present frame has the same value as that pixel in the same block in the preceding frame. If the two blocks of pixel values coincide, for each pixel in the present frame and in the preceding frame, pixel value prediction for this block in the present frame requires use or setting of only one bit or flag, referred to as an "identical-block bit or flag", indicating that this block of pixel values is the same as the block of pixel values for the same block in the preceding frame (already received).

If the identical-block bit or flag is not set, the block is then evaluated to determine if each pixel in the block in the present frame has the same value; this indicates that the block is a dc-only block. If all the pixel values in the block are identical, it is sufficient to code only one sample for that block, plus (optionally) setting a dc-bit for that block to indicate that all pixels in that block and that frame have the same value. In addition, rather than encoding the raw pixel value, a prediction of the current sample value is made using a previously coded adjacent sample value, and the difference between the current sample value and the predicted value is encoded. This technique, Differential Pulse Code Modulation (DPCM), has been used in image and speech coding.

Figure 1A:
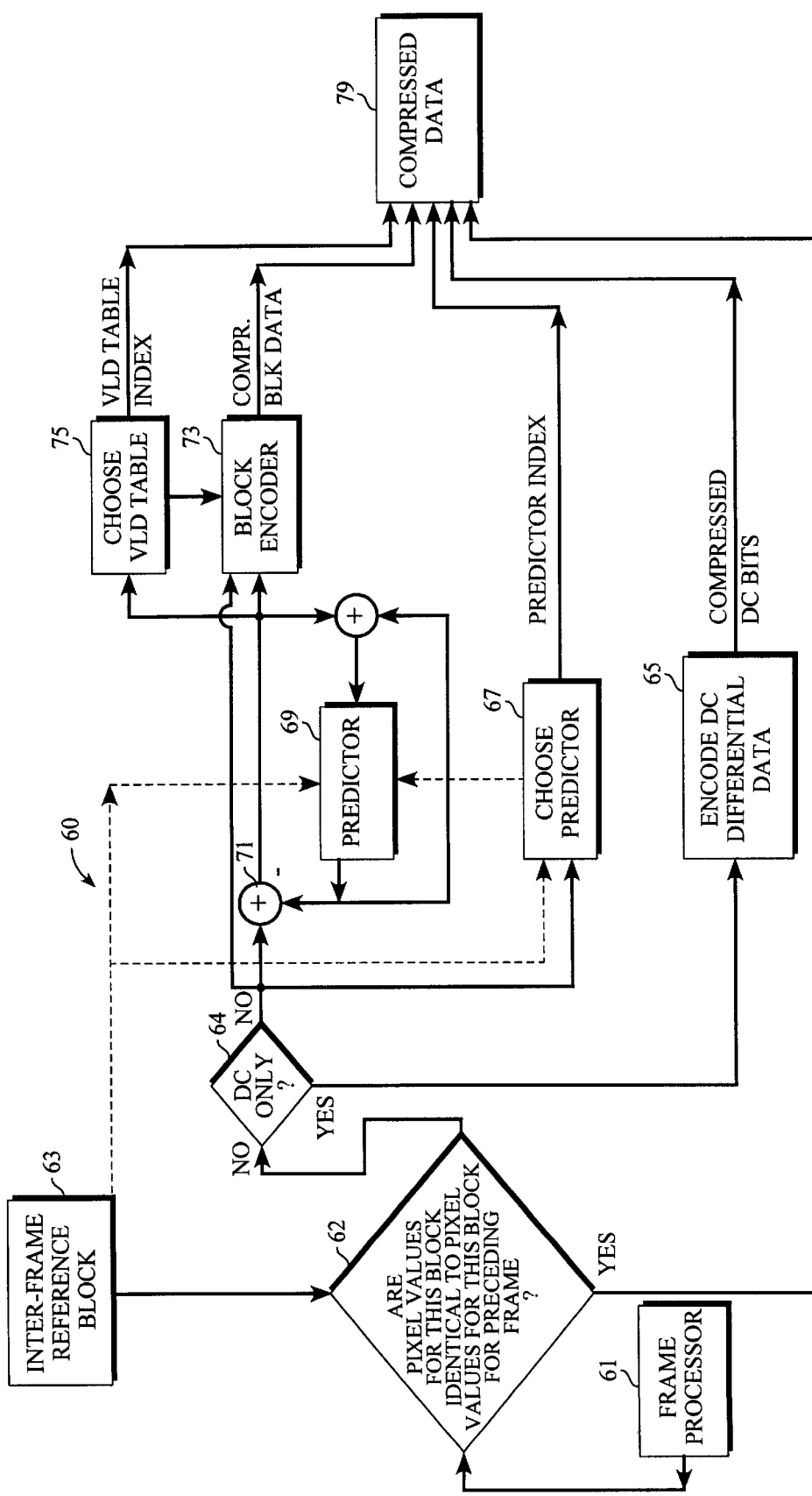
FIGS. 1A, 1B, 1C, and 8 are schematic views of apparatus to practice the invention.

FIG. 1A is a block diagram of apparatus that can be used to practice the invention for intra-frame and inter-frame block processing. An image in a frame can be represented as a collection of rectangular blocks of pixels, each block having P rows and Q columns. Each block may contain text, graphics, natural images, etc. A frame representing a video image to be coded is received by a frame processor 61 and is split into a plurality of P×Q blocks of images. Rastered pixel values are received in one or more streams by a raster-to-block converter, which is optionally part of the frame processor 61, that converts rastered data to block data.

The processed frame data, now in block format, is received by a frame interrogator module 62 that determines if the present block of pixel values in the present frame is identical to the same block of pixel values in the preceding frame. The interrogator module 62 also receives and uses information from an inter-frame reference block module 63 in making this determination. If the answer to the query by the interrogator module 62 is "yes", the identical-block bit is set and received by a compressed data module 79 that accumulates compressed data for each block. The inter-frame reference block module 63 also provides processing information for a predictor selection module 67 and for a predictor module 69, which are discussed in the following.

If the answer to the query posed by the interrogator module 62 is "no", the block of pixel value data is interrogated by a comparator 64 that determines if the data in a given block are all "dc"; that is, if all pixel values in this block have the same value. If the answer to the query by the comparator 64 is "yes", a differential encoder 65 receives and encodes the block data as dc differential data (e.g., all values constant) and sends the compressed dc block data to the compressed data module 79.

For non-dc blocks, where the answer to the query of the comparator 64 is "no", the optimal prediction scheme has the potential to vary block-by-block, or even pixel-by-pixel. A prediction scheme that is optimal for the current input block is chosen, block-by-block, from among several predictors. The different predictor schemes may be statically or dynamically chosen. A predictor selection module 67 receives the input block of pixel value differences, selects the optimal predictor for the current input block, and provides this information for a predictor module 69 and for the compressed data module 79. The prediction selector module 67 optionally also receives pixel value differences for corresponding blocks in two or more adjacent video frames and determines a frame-to-frame predictor for the corresponding blocks.

Where static predictor selection within a frame is implemented, a set of predictors is selected to be used in a certain image coding system. For a given block, the predictor that is optimal for this block is chosen, and the information on which this selection is based is sent to a decoder as part of a coded bitstream. In a dynamic selection scheme, an optimal predictor for a given block can be found and used to obtain the prediction differences or residuals. The information needed to uniquely specify a predictor may be sent to the decoder as part of the coded bitstream.

Let $x(i,j,h)$ be the current pixel image value to be encoded, where the index i represents the scan line of the current pixel, the index j represents the pixel location on the scan line and the index h represents the frame number. For example, four neighboring sample values in the same frame, $x(i-1,j-1,h)$, $x(i-1,j,h)$ and $x(i,j-1,h)$, can be used to help predict the value for the current sample. In this example, the prediction can be made as a linear combination $$x_p(i,j,h) = a \cdot x(i-1,j-1,h) + b \cdot x(i-1,j,h) + c \cdot x(i,j-1,h) + d \cdot y(i,j,h+h0), \quad (1)$$

where the real numbers a, b, c and d characterize this predictor and the transform quantity $y(i,j,h+h0)$ is a linear combination of one or more pixel values from an adjacent frame. Normally, the quantity $y(i,j,h+h0)$ refers to the immediately preceding frame so that $h+h0=h-1$. However, the quantity $y(i,j,h+h0)$ may refer to any adjacent frame so that h0 may, for example, have any of the values −2, −1, +1 and +2.

In certain situations, the transform quantity $y(i,j,h+h0)$ is related to a motion vector $(mv_x, mv_y)$ that associates a linear combination of pixel locations on an adjacent frame $(h+h0)$ with a pixel location on the present frame (h). This association takes account of the possibility that a pixel location or combination of pixel locations on an adjacent frame (formed at time $t=t'+t0$) corresponds to a given pixel location (formed at a different time $t=t'$). This association might occur, for example, where a video camera is panned across a region, and pixel location representing a given portion of the image moves with time across a display screen.

Where the motion vector is purely translational, with no rotation or scale factor change, the transform quantity $y(i,j,h+h0)$ is representable as $$y(i,j,h+h0) = x(i-mv_x, j-mv_y, h+h0), \quad (2)$$

where $(mv_x, mv_y)$ is a pure translation vector for this pixel location. Where the motion vector involves both translation and rotation (by a selected angle θ about a central axis perpendicular to a plane of the image), the transform quantity $y(i,j,h+h0)$ is representable as $$y(i,j,h+h0) = x(i \cdot \cos θ + j \cdot \sin θ - mv_x, -i \cdot \sin θ + j \cdot \cos θ - mv_y, h+h0). \quad (3)$$

Figure 2:
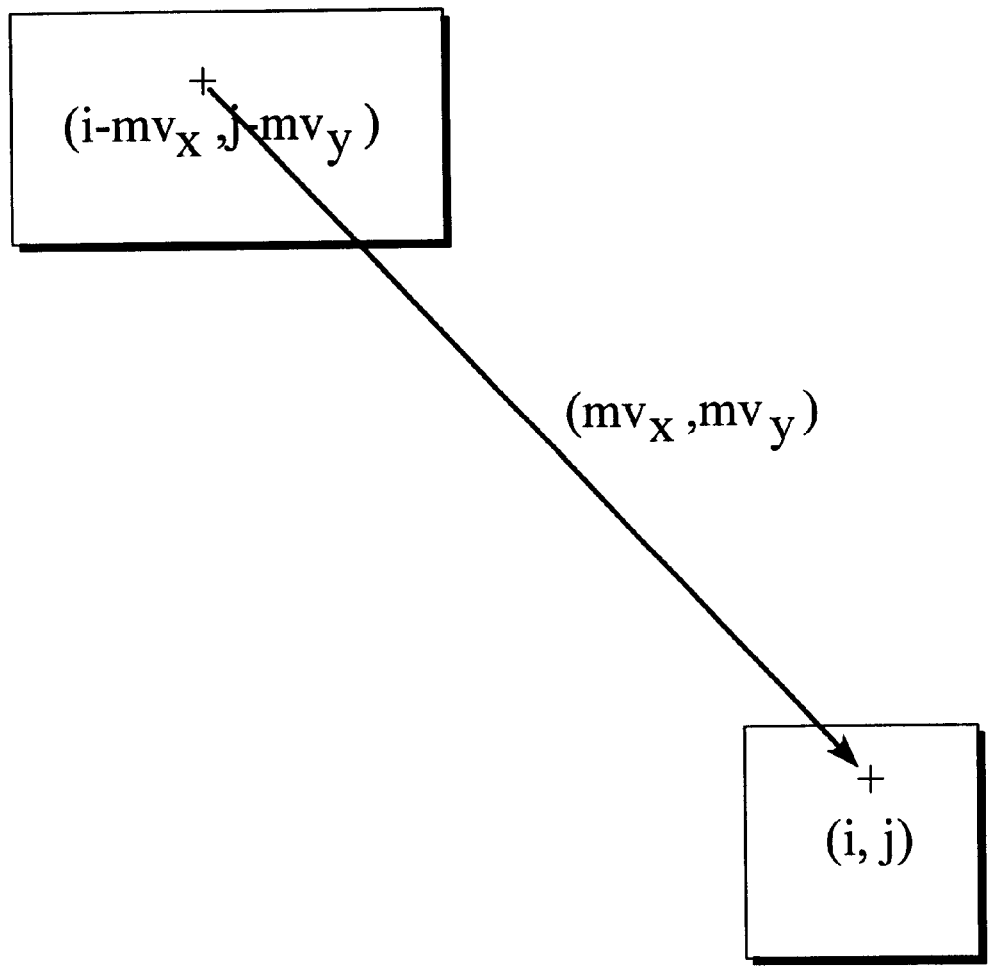
FIG. 2 illustrates use of a translational motion vector.

Introduction of a scale factor, which may be different in each of two independent directions, requires multiplication of each of the first and second coordinates, i' and j', in the function $x(i',j',h+h0)$ by an independent scale factor (preferably non-zero), where the two scale factors may be, but need not be, the same. A pure translation motion vector is illustrated in FIG. 2. More generally, a "motion vector," as used herein, refers to a linear transformation of a pixel location (or group of such locations) in a first frame into a pixel location (or group of such locations) in a second frame, where the pixel value in the first frame contributes to, or determines, the pixel value in the second frame.

It is standard practice to represent a motion vector with a one-half pixel or one-quarter pixel accuracy. Where such an approaches adopted, when the motion vectors do not have integer-pixel-value alignment, a reference block is obtained and a simple filtering operation is performed to obtain a prediction. This procedure is generally referred to as "motion compensation."

In a static selection scheme, the predictor coefficients are restricted to a predetermined set. For example, inter-frame static predictor coefficients may be restricted to nine linear combinations of the four known pixel image values set forth in Eq. (1), as illustrated in Table 1.

TABLE 1

| Predictor Index | Predictor Coefficients | | | |
| --- | --- | --- | --- | --- |
| | a | b | c | d |
| 0 | 1 | 0 | 0 | 0 |
| 1 | 0 | 1 | 0 | 0 |
| 2 | 0 | 0 | 1 | 0 |
| 3 | 1 | 1 | −1 | 0 |
| 4 | 1 | 0.5 | −0.5 | 0 |
| 5 | 0.5 | 1 | −0.5 | 0 |
| 6 | 0.5 | −0.5 | 1 | 0 |
| 7 | 0 | 0 | 0 | 1 |

In the examples shown in Table 1, the coefficients a, b, c and d for any predictor index (Pred_index) have an algebraic sum of 1, although this is not required for all sets of indices. Where the predictor index number 7 is chosen, this index may include a selection of one or more motion vector parameters, such as θ, $m_x$ and/or $m_y$. In a static prediction system, for each input block the predictor, among a fixed number of choices, such as the eight in Table 1, that is the most suitable for the current input block is chosen, and this information is sent to the decoder.

For more general inter-frame prediction, using frames h+h0 and h, a more extensive linear combination of the pixel values for the preceding frame and the present frame can be used to predict a pixel value for the present frame. For example, the predictor $x_p(i,j,h)$ in Eq. (1) may be replaced by a linear combination of as many as ten explicit pixel values, plus a linear combination of pixel values arising from a motion vector transform:

$$\begin{aligned} x_p(i, j, h) = & \, a1 \cdot x(i-1, j-1, h) + a2 \cdot x(i-1, j, h) + \\ & a3 \cdot x(i, j-1, h) + a4 \cdot x(i-1, j-1, h+h0) + \\ & a5 \cdot (i-1, j, h+h0) + a6 \cdot x(i, j-1, h+h0) + a7 \cdot x(i, j, h+h0) + \\ & a8 \cdot x(i+1, j, h+h0) + a9 \cdot x(i, j+1, h+h0) + \\ & a10 \cdot x(i+1, j+1, h+h0) + a11 \cdot y(i, j, h+h0). \end{aligned} \quad (4)$$

Here, the transform quantity $y(i,j,h+h0)$ is determined in a manner similar to that discussed in connection with Eqs. (2) and (3).

In a dynamic selection scheme, the predictor coefficients can take any values and are not restricted to a fixed set of values for a given input block or for a given frame. The encoded values of the filter coefficients are also sent to the decoder as a three- or four-bit index in this example.

In the predictor module 69, because the dynamic range of the input pixels is known for a block in a given frame, the dynamic range of the predicted values are arranged to lie in the same range. For example, each of the input samples with an M-bit representation has a value in the range $[0, 2^M-1]$. Depending upon the predictor coefficients used and the pixel values, the predicted value may lie outside the normal range of $[0, 2^M-1]$. As a result, the prediction values are preferably clamped to fall within the dynamic range of the input pixels.

As an example, where M=8 bits per pixel image are used to form the images, let a=b=1, c=−1, d=0, x(i−1,j,h−1)=x(i,j−1,h−1)=0 and x(i−1,j−1,h−1)=128. According to the prediction relation (1), the predicted value is $x_p(i,j,h)$=−128. Because the predicted value $x_p(i,j,h)$ is less than the minimum value, the predicted value is clamped to the minimum value, $x_{min}$, which is 0 in this example. In a similar manner, a predicted value that is greater than the maximum value is clamped to the maximum value, $x_{max}$, which is 128 here. A procedure that can be followed in this example is if $(x_p(i,j,h)<x_{min})x_p(i,j,h)=x_{min}$;

if $(x_p(i,j,h)>x_{max})x_p(i,j,h)=x_{max}$.

Another procedure, expressed in mathematical form, that achieves this result is $$x_p(i,j)_{clamped}=\min\{\max\{x_{min},x_p(i,j,h)\},x_{max}\} \quad (5A)$$

or $$x_p(i,j)_{clamped}=\max\{\min\{x_{max},x_p(i,j,h)\},x_{min}\} \quad (5B)$$

A third mathematical procedure that achieves the desired result is $$x_p(i,j,h)_{clamped}=0.5\{|x_p(i,j,h)-x_{min}|-|x_p(i,j,h)-x_{max}|+x_{max}-x_{min}\}, \quad (6)$$

For each procedure, the values after clamping are limited to a range $$x_{min} \leq x_p(i,j,h) \leq x_{max}, \quad (7)$$

where $x_{min}$ may be 0 and $x_{max}$ may be $2^M-1$, if desired.

A difference module 71 receives a block of actual pixel values x(i,j) and a corresponding block of predicted pixel values xp(i,j) and forms and issues difference values Δx(i,j,h)=$x_p$(i,j,h)−x(i,j,h). These difference values are received by an intra-frame block encoder 73 and by a variable length code (VLC) table selector 75. The block encoder 73 forms and issues compressed data for non-dc blocks with the information from the VLC table selector 75, which provides information on which VLC table should be used. A compressed data block 79 concatenates all information from the different blocks and issues the compressed bitstream in a specific format.

Where the following block is a dc-only block, the Pred__index number 0 is used. Where the following block is not dc-only, the predictor that gives the best cumulative results for each P×Q block is chosen. Thus, each P×Q block may require a different choice of Pred__index. Given a block to be encoded, any suitable criterion may be used to select the predictor coefficients. Specification of any of the eight possible predictors in Table 1 uses a three-bit field (for non-dc-only blocks). The number of predictor indices is not limited to 8 and may be any reasonable number.

Figure 1C:
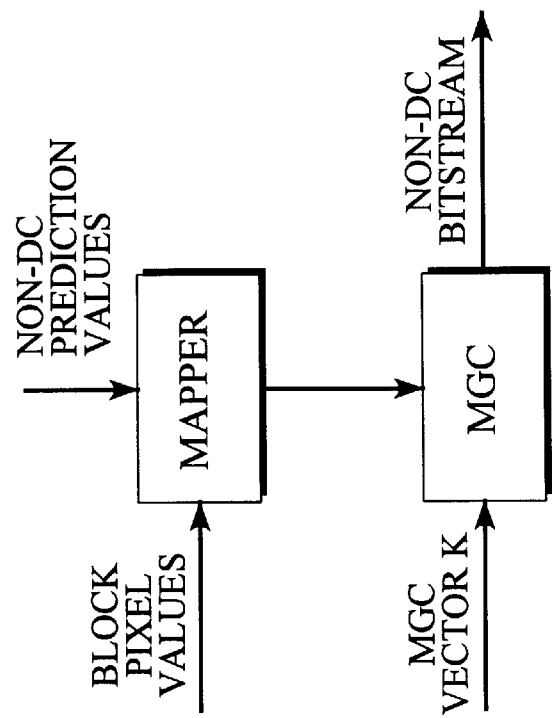
Figure 1B:
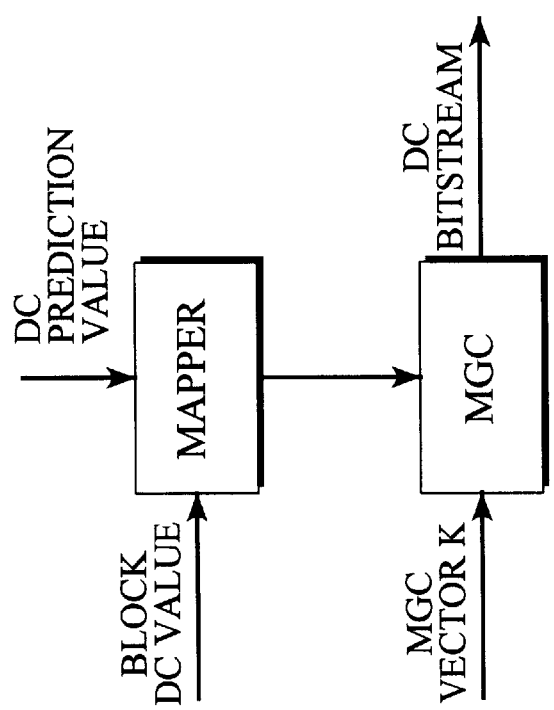

FIG. 1B is a block diagram illustrating an approach for implementing the encoder block 65 for a dc block of data. A mapper module 65A receives an input signal, representing the dc value for that block, at a first input terminal and receives a selected dc prediction value for that block at a second input terminal. The mapper module 65A provides a mapper output signal that is received at a first input terminal of a dc/modified Golomb coding (MGC) module 65B. The dc/MGC module 65B receives a (constant length) MGC vector K, discussed in the following, at a second input terminal. The MGC module 65B provides an output bitstream of compressed (dc) block data that is received by the compressed data module 79 (FIG. 1A).

FIG. 1C is a block diagram illustrating an approach for implementing the encoder block 73 for a non-dc block. A mapper module 73A receives an input block of (non-constant) data x(i,j) at a first input terminal and receives difference data Δx(i,j) for that block at a second input terminal. The mapper module 73A provides an output signal that is received at a first input terminal by a run-length modified Golomb coding (MGC) module 73B. The MGC module 73B receives an MGC vector K, discussed in the following, at a second input terminal. The MGC module 73B provides an output bitstream of compressed (non-dc) block data that is received by the compressed data module 79 (FIG. 1A).

The difference $$\Delta x(i,j,h)=x(i,j,h)-x_p(i,j,h) \quad (8)$$

between a pixel image value x(i,j,h) and the corresponding predictor value $x_p(i,j,h)$ has a value in a range between $-(2^M-1)$ and $+(2^M-1)$. However, if the prediction value $x_p(i,j)$ is known and satisfies a constraint such as (5), the difference value Δx can take only an eight-bit range around the Prediction value so that a 1-1 mapping can be constructed of the difference, Δx=x−$x_p$, onto, for example, the integer set $[0, 2^M-1]$.

For any predictor, the difference Δx(i,j,h) between the actual value and a predicted value of pixel content will have a maximum value and a minimum value that are related by $$x_{max}-x_{min}=2^M-1, \quad (9)$$

although the individual values for the maximum and minimum values may vary from one pixel to another pixel. A suitable 1-1 mapping of the positive integers and the negative integers in the pixel value range onto a single segment of the positive integers, such as [0,511], is defined by $$F(0)=0, \quad (10A)$$

$$F(\Delta x)=2\cdot\Delta x-1(\Delta x=1, 2, 3, \ldots, 2^M-1), \quad (10B)$$

$$F(\Delta x)=2\cdot|\Delta x|(\Delta x=-(2^M-1),-(2^M-2), \ldots, -2,-1) \quad (10C)$$

For the range of difference values for the quantity Δx(i,j), a modified mapping, F(Δx;mod), is introduced that (1) includes all difference values that can be reached, (2) has a range limited to at most $2^M-1$ consecutive values and (3) is also 1-1. The mapping F(Δx;mod) is defined differently for each realistic range of the difference value Δx. For example, assume that M=8 and that the maximum value and minimum value for the difference Δx for a particular pixel are +5 and −250, respectively, with all difference values between −250 and +5 being reachable by the difference Δx. The mapping F(Δx;mod) provides the following sequence of correspondences for this example:

| Δx | → | F(Δx; mod) |
|---|---|---|
| 0 | | 0 |
| 1 | | 1 |
| −1 | | 2 |
| 2 | | 3 |
| −2 | | 4 |
| 3 | | 5 |
| −3 | | 6 |
| 4 | | 7 |
| −4 | | 8 |
| 5 | | 9 |
| −5 | | 10 |
| 6 | | 11 |
| −6 | | 12 |
| −7 | | 13 |
| −8 | | 14 |
| ... | | |
| −250 | | 255 |

The correspondence defined by the mapping F(Δx;mod) takes account of the fact that the integers +6, +7, ..., +255, −255, −254, −253, −252, −251 cannot appear in the legitimate values for the difference Δx and are thus invalid integers that can be deleted in the sequence of (only) valid integers in this sequence. When the invalid integers Δx=+6, +7, ..., +255, −255, −254, −253, −252, −251 are deleted from the sequence of all integers in the range [−255, +255], the remaining 256 integers number permit construction of the 1-1 mapping F(Δx;mod) set forth in the preceding. The particular mapping F(Δx;mod) will depend upon the particular maximum and minimum values for the difference Δx. Other suitable 1-1 mappings (permutations) that achieve the same result as the mapping F(Δx;mod) can also be used here. The mapping F(Δx;mod) can be generalized to other choices of the index M as well.

Existence of a mapping such as F(Δx;mod) can be used to calculate the code word index of the differential value. The following computation procedure is used for a choice of M=8:

```
int getVldIndex //unsigned char prediction//
{
int levels, maxval, tmp;
unsigned int index;
int x, xh;
    levels = 256;
    maxval = levels −1;
    xh = prediction;
    x = input;
    tmp = 2*xh;
    if ((x <= xh) && (tmp <= (maxval + x)){
    index = 2*(xh − x);
    }
    else if {(x <= xh) && (tmp > maxval + x))){
    index = maxval − x;
    }
```

-continued

```
    else if ((x > xh) && (tmp < x)){
    index = x;
    }
    else if {(x > xh) && (tmp >= x)){
    index = 2*(x − xh) − 1;
    {
return index;
}
```

Figure 3A:
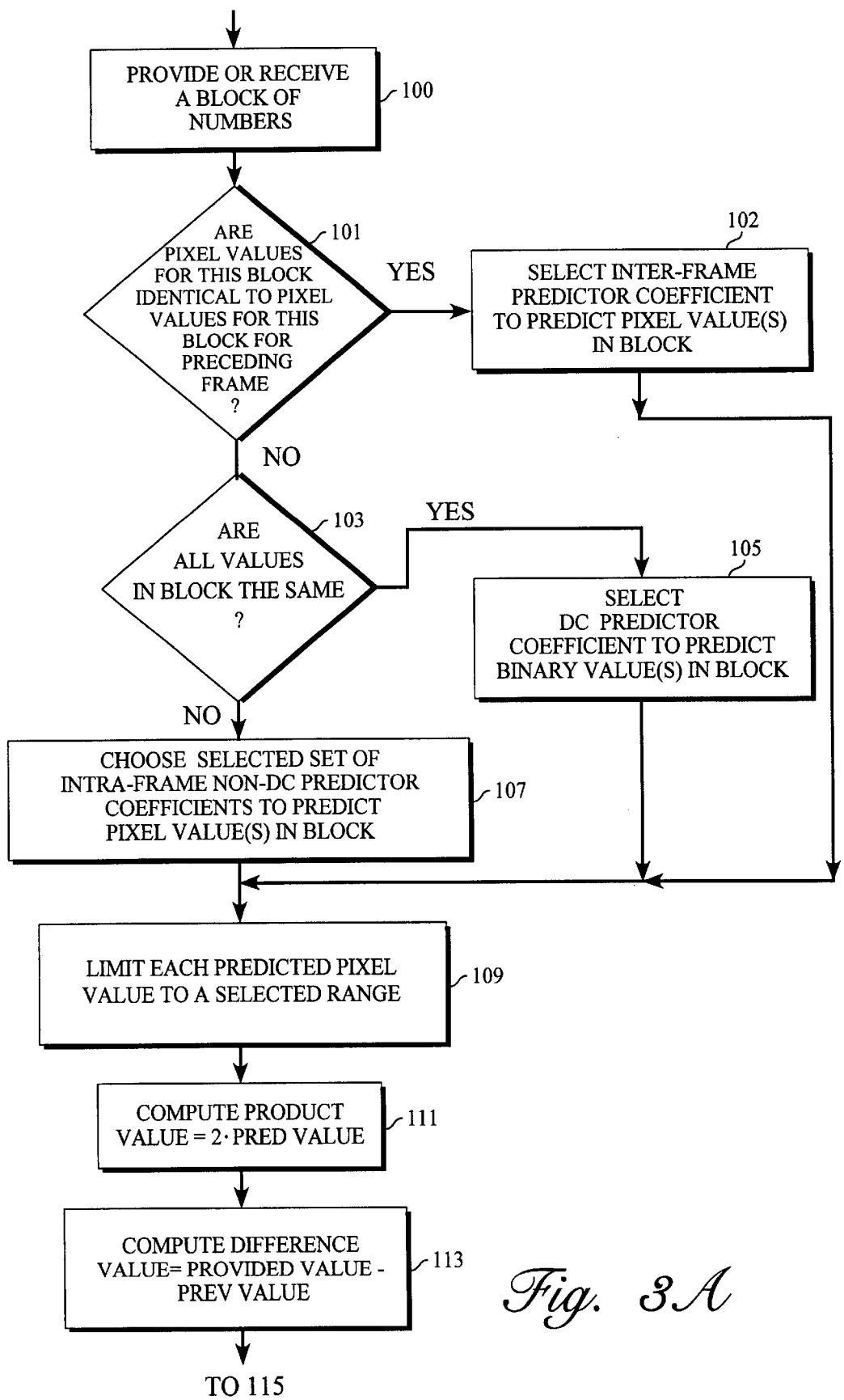
FIGS. 3A, 3B and 3C are a flow chart of the inventive procedure.
Figure 3B:
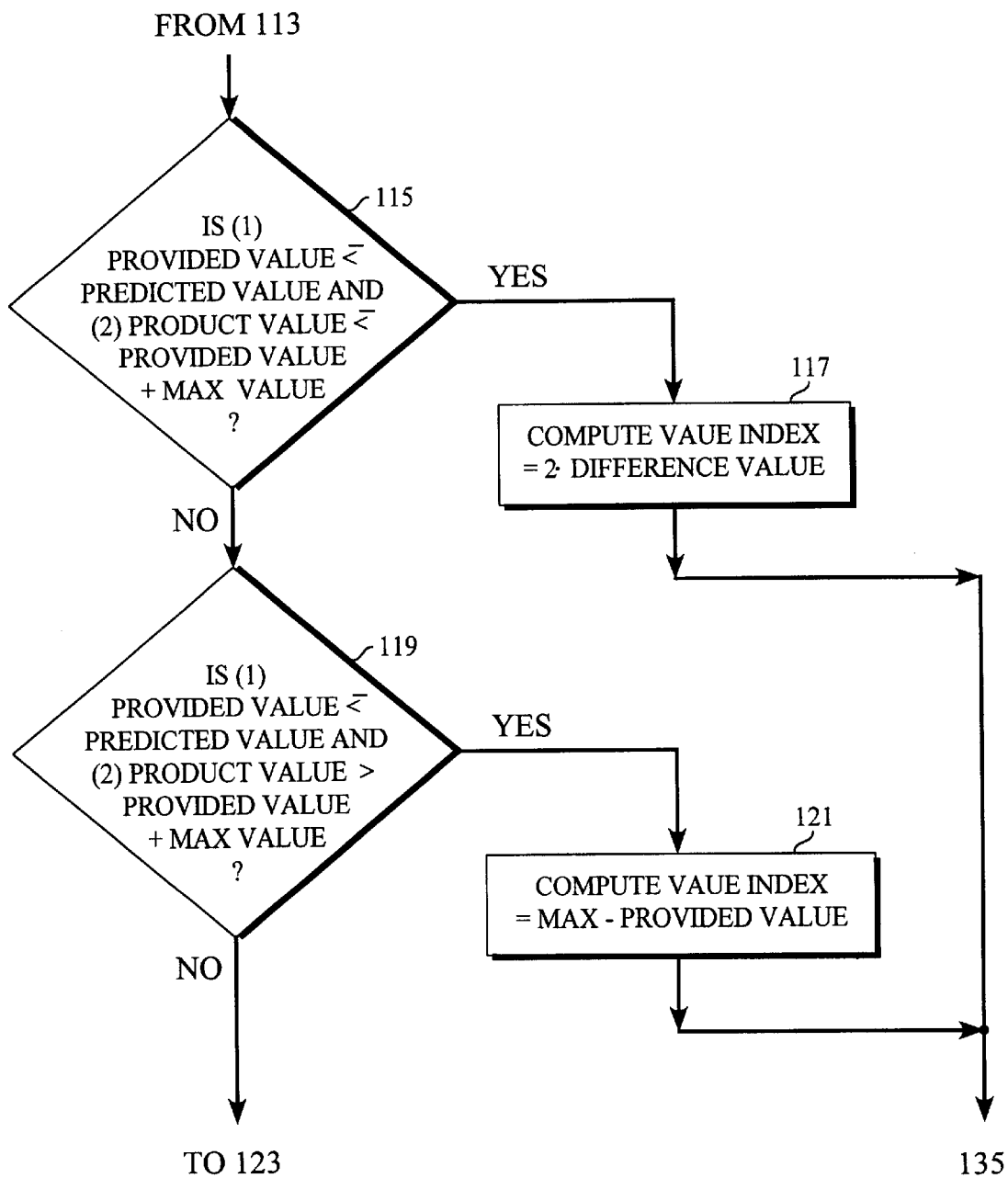
Figure 3C:
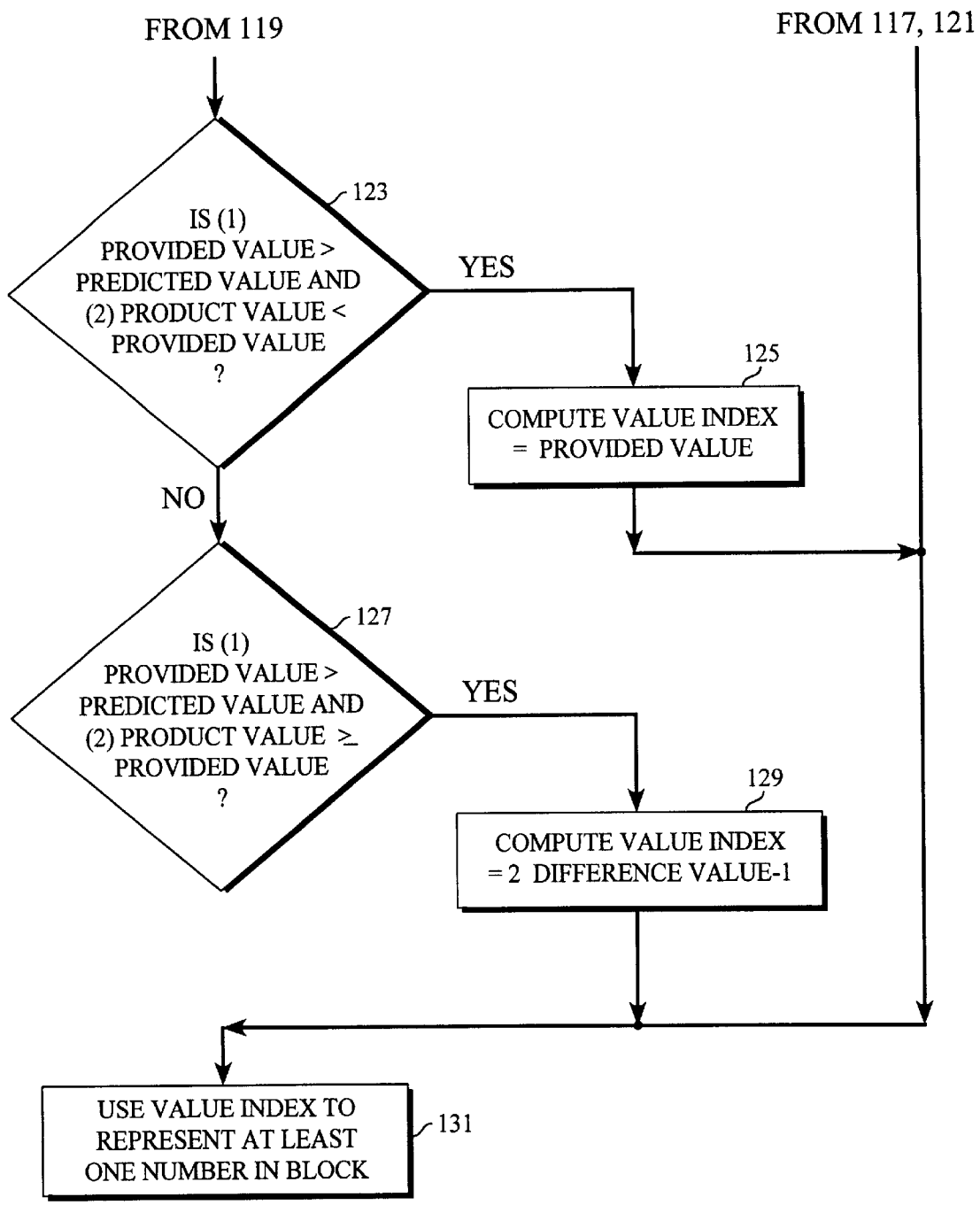

The procedure set forth in the preceding is illustrated in flow chart format in FIGS. 3A, 3B and 3C. The system provides or receives a block of binary-valued numbers, including at least one Provided Value ("Prov Value"), in step 100. In step 101, the system determines if the block of pixel values for the present frame are the same (pixel-by-pixel) as the same block of pixel values for the preceding frame. If the answer is "yes" so that the identical-block bit is set, the system provides an inter-frame predictor coefficient to predict pixel values in the present block (e.g., Eq. (1) with a=b=c=0 and d≠0), in step 102, and the system moves to step 109, discussed below.

If the answer to the query in step 101 is "no" (identical-block bit not set), the system moves to step 103 and determines if the pixel values in the present block all have the same value so that the block is a dc block. If the answer to the query in step 103 is "yes", the system chooses a selected dc predictor coefficient, such as Pred_index=0 in Table 1, in step 105, and computes a Predicted Value ("Pred Value") for the block values, using a dc predictor coefficient. From step 105, the system moves to step 109, discussed in the following. If the answer to the query in step 103 is "no", the system moves to step 107, where it chooses a second Pred_index and a selected set of non-dc predictor coefficients and computes at least one Predicted Value in the block, using non-dc intra-frame predictor coefficients (e.g., Eq. (1) with d=0).

In step 109 (optional), the system limits each predicted binary value to a selected range of values, with a max value. In step 111, the system computes a Product Value ("Prod Value"), equal to twice the Predicted Value. In step 113, the system computes a Difference Value, equal to the difference between the Provided Value and the corresponding Predicted Value.

In step 115, the system determines if both of (1) Provided Value≦Predicted Value and (2) Product Value≦Provided Value+max value are satisfied. If the answer to the compound question in 115 is "yes", the system moves to step 117 and computes a Value Index, equal to twice the Difference Value, and moves to step 131, discussed in the following.

If the answer to the question in 115 is "no", the system moves to step 119 and determines if both of (1) Provided Value≦Predicted Value and (2) Product Value>Provided Value+max value are satisfied. If the answer to the compound question in 119 is "yes", the system moves to step 121 and computes a Value Index, equal to max value minus the Provided Value, and moves to step 131.

If the answer to the question in 119 is "no", the system moves to step 123 and determines if each of two conditions, (1) Provided Value>Predicted Value and (2) Product Value<Provided Value, is satisfied. If the answer to the compound question in 123 is "yes", the system moves to step 125 and computes a Value Index, equal to the Provided Value, and moves to step 131.

If the answer to the question in 123 is "no", the system moves to step 127 and determines if each of two conditions, (1) Provided Value>Predicted Value and (2) Product Value≧Provided Value, is satisfied. If the answer to the compound question in 127 is "yes", the system moves to step 129 and computes a Value Index, equal to twice the Difference Value minus 1, and moves to step 131. In step 131, the system uses the computed Value Index to represent at least one number in the block.

Except for the boundary cases, where a pixel is located on an edge of a P×Q block, the positive difference values are scaled by a factor of 2, and then reduced by 1; the negative differential values are first negated (so that they become positive) and then multiplied by a factor of 2. The number 1 is subtracted from each scaled positive value (without negation) so that the result is odd-valued and can be distinguished from the scaled negative values, which correspond to even-values integers. For example, let x(i,j)=128 and the Prediction Value=130. Because the current image value x(i,j) is less than 130 and tmp (=2·130) is less than (255+ 128), the index is equal to 2·(130−128)=4.

The residual or difference values Δx can be efficiently represented by entropy coding methods that use variable code lengths for each words. In the present coding scheme, a variable-length code word corresponding to the index computed as above is sent to the decoder as a part of the coded bitstream. The specific variable length code used here is a modified Golomb coding (MGC) technique as outlined in the following.

Entropy coders based on Huffman coding have been widely used in the context of image and video coding. Although entropy coding provides a satisfactory result without requiring that extensive context analysis be performed, this approach requires provision of large tables for lookup operations and offers little flexibility for on-line adaptation. To address the lookup table size requirements, a Golomb coding method could be used, as set forth by S. Golomb in "Run-length encodings", I.E.E.E. Trans. on Information Theory, vol. IT-12, 1966, pp. 399–401. However, Golomb codes can only be optimal for certain probability distributions. To alleviate this, an MGC technique was developed in a prior patent application, "Memory Efficient Variable Length Encoding and Decoding System", U.S. Ser. No. 09/xxx,xxx. The MGC scheme uses a small table for adaptability and requires no table for actual decoding of the symbols. This scheme has the ability to optimally adapt to the varying statistical characteristics of the data, while requiring no tables for decoding of the symbols. The details are given in this patent application.

The basic Golomb code is usually specified by a parameter m, preferably an integer greater than 1, for which a positive fraction p satisfies $p^m=0.5$ (0.5<p<1). For any non-negative integer n, the variable-length code includes two parts: a variable length part, representing the integer portion of a ratio n/m, written $[n/m]_{int}$, and a fixed-length part, n modulo m. To make the implementation simpler, m is restricted to be a power of 2 ($m=2^k$ with k≧1), although this requirement can be relaxed. The fixed-length part (n mod m) is represented using k bits, where k is a selected integer satisfying $2^{k-1}<m\leq2^k$. The variable portion of the ratio n/m, written $n'=[n/m]_{int}$, is represented using a run of n' zeroes, followed by a 1. As a result, the bit length of any code word n is given by $$\text{bitLength}(n)=[n/m]_{int}+k+1, \quad (11)$$

where k ($\approx\log_2(m)$) is the length of the fixed length portion of the representation. Although the implementation is simple, Golomb coding is not optimal for most probability distributions. The optimality is further compromised for values of m that are powers of two. The basic Golomb coding is improved by introducing the following modification.

Let D be the set of all possible non-negative data fields. Divide D into N bins, $$D=B0\cup B1\cup\ldots\cup B(N-1), \quad (12)$$

where bin Bi has Mi elements (Mi≧1). First assume that the number Mi is a power of two, expressed as $$Mi=2^{k(i)}. \quad (13)$$

If a data field (element) belongs to the bin Bi, the index within the bin can be uniquely identified using k(i) bits, where the bit length is $$\text{bitLength}(Bi)=i+1+k(i). \quad (14)$$

The bins Bi are identified using runs of i zeroes followed by 1. Hence, any bin can be represented using i+1 bits. This code can be uniquely specified by the vector K (given D) which is given by $$K=\{k(0),k(1),\ldots,k(N-1)\}. \quad (15)$$

To encode an input sample n, given the vector K, the following procedure can be followed:

```
prevIndex = 0;
index = 1 << k(0);
bin = 0;
while (n >= index)
{
    bin = bin + 1;
    prevIndex = index;
    index = index + (1 << k(bin));
}
encodeBin (bin);
encodeOffset(n - prevIndex);
``` where encodeBin is a procedure for encoding the variable length portion and encodeOffset is a procedure for encoding the fixed-length portion.

One can easily verify that by changing the vector K, one will be able to adapt the variable-length codes according to the underlying probability distribution. This is the method used in this image coder.

For example, the coder may use the following 16-entry table for varying values of K:

TABLE 2

K-Vector Components.

| Index | {k(0), k(1), k(2), k(3), k(4)} |
|---|---|
| 0 | {6, 6, 6, 6, 6} |
| 1 | {5, 5, 5, 5, 5} |
| 2 | {4, 4, 4, 4, 4} |
| 3 | {3, 3, 3, 3, 3} |
| 4 | {2, 2, 2, 2, 2} |
| 5 | {1, 1, 1, 1, 1} |
| 6 | {2, 1, 1, 1, 2} |
| 7 | {0, 1, 1, 1, 1} |
| 8 | {5, 6, 6, 6, 6} |
| 9 | {4, 5, 5, 5, 5} |
| 10 | {3, 4, 4, 4, 4} |
| 11 | {2, 3, 3, 3, 3} |
| 12 | {2, 2, 1, 1, 2} |
| 13 | {2, 3, 3, 4, 4} |
| 14 | {0, 1, 2, 2, 3} |
| 15 | {0, 1, 2, 2, 2} |

For code words with a bit-length greater than 17, an Escape coding technique is used. That is, the code word for ESCAPE is used, followed by an M-bit index representing the differential value between the input and the prediction. One constraint used here is k(i)=k(4) for i>4. The quantity k(8) is preferably used for ESCAPE. While better choices may be available, this was chosen. One example of a variable-length code for ESCAPE is '000000001'. Another is '00000001'. In such an instance, all code words with more than 16 bit lengths greater than 16 are coded using an Escape coding technique.

Several different MGC coding approaches can be used here, each with a different set of K-vector components, and a table need not have 16 entries. A suitable alternative to Table 2 is shown in Table 3, in which two K-vectors are changed relative to Table 2.

TABLE 3

K-Vector Components.

| Index | {k(0), k(1), k(2), k(3), k(4)} |
|---|---|
| 0 | {6, 6, 6, 6, 6} |
| 1 | {5, 5, 5, 5, 5} |
| 2 | {4, 4, 4, 4, 4} |
| 3 | {3, 3, 3, 3, 3} |
| 4 | {2, 2, 2, 2, 2} |
| 5 | {1, 1, 1, 1, 1} |
| 6 | {7, 7, 7, 7, 7} |
| 7 | {0, 1, 1, 1, 1} |
| 8 | {5, 6, 6, 6, 6} |
| 9 | {4, 5, 5, 5, 5} |
| 10 | {3, 4, 4, 4, 4} |
| 11 | {2, 3, 3, 3, 3} |
| 12 | {2, 2, 1, 1, 2} |
| 13 | {2, 3, 3, 4, 4} |
| 14 | {0, 1, 2, 2, 3} |
| 15 | {8, 8, 8, 8, 8} |

The following example, with the choice M=8, may clarify the procedure. The coding includes the prescription x(i,j)=255, Prediction=20 differential value=235 vid index=255;

Using the Modified Golomb Code (1,1,1,1,1), the number of elements in different bins is given by {2, 2, 2, 2, 2, 2, 2, 2, 0, 2, 2, 2, 2, 2, 2, 2, 2, 2, 2, . . . }, and the code word-lengths corresponding to the elements in each bin is given by {2, 3, 4, 5, 6, 7, 8, 9, ESCAPE, 11, 12, 13, 14, 15, 16, 17, 18, . . . }. If raw coding is used, the vld-index 255 belongs to bin 127, and needs a total bit-length of 127+1+1 (to offset for ESCAPE)+1 (to uniquely represent the element in each bin) for a total of 130 bits. However, with ESCAPE coding, a nine-bit code to represent an ESCAPE code word, followed by an 8-bit code word to represent the vld-index 255, is sent (code word '00000000111111111').

Because the pixel values are differentially coded, the vld index value 0 is the most frequently occurring index value within a block. The zero-value index can be efficiently coded using the MGC table with k(0)=0. For typical images, consecutive zero-values indices, or zero-runs, are also common. It is expected that zero-runs of length 1 and length 8 are the most frequently occurring patterns in these images. For a more general block size, P×Q, the most frequently occurring patterns would be runs of lengths 1 and Q.

To handle zero-runs in a manner similar to treatment of the number of vertical pixels in a P×Q block efficiently, zero-runs of length Q were checked only at row boundaries. For example, for an input block of 8×8 pixels, at most 8 zero-runs of length 8 are possible. If one or more zero-run of length Q is present, a bit is set to indicate the presence of this condition, followed by a P-bit codeword to specify which row of the P×Q block has the zero-run. For rows that do not contain a zero-run of length Q, the differential data are encoded using the MGC technique mentioned in the preceding. The c-code for this procedure is set forth in the following:

```
lcount = 0;
for (i=0; i<P; i++) { /*for each block line*/
    rowz=0;
    for (j=0; j<Q; j++) {
    rowz += (diff[i*Q=j] == 0);
    }
    ident[i] = (rowz==Q);
    lcount += (rowz==Q);
}
if (lcount=0) {
    putbits(1,1);
        for (i=0; i<P; i++)putbits(1,ident[i]);
}
else {
    putbits(1,0);
}
```

Figure 7:
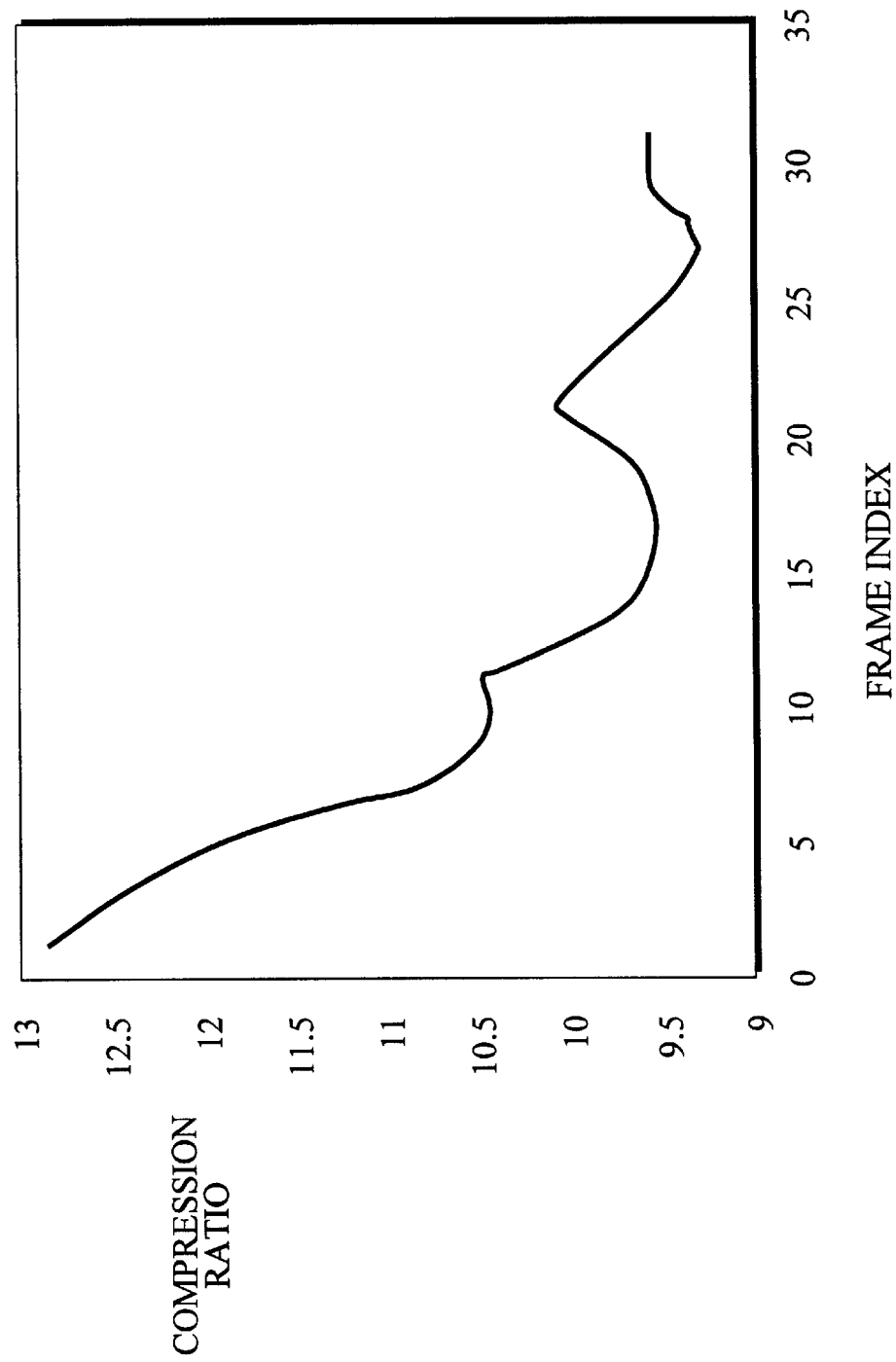
FIG. 7 illustrates compression achieved using the invention.

Compression performance of the video coding approach disclosed here, using the compression ratio as a figure of merit, is shown graphically in FIG. 7 for a representative sequence of graphics video images. For the sequence shown, the compression ratio varies from about 9.3 to about 12.8. Significant video compression is achieved with high computational efficiency, even though the coding is lossless. No standard lossless video coder is yet available against which these results can be compared.

Another advantage of the invention arises from the possibility of parallel processing. Processing of data in blocks, use of the particular prediction schemes discussed herein and use of modified Golomb coding allows the system to process two or more blocks simultaneously, without requiring that each pixel value be processed seriatim and in a fixed order. This parallel processing approach provides a significant advantage in time required, in seconds, to compress and to decompress a given image.

Coding of a given block of data according to the invention does not depend upon how any preceding block was coded.

Figure 4:
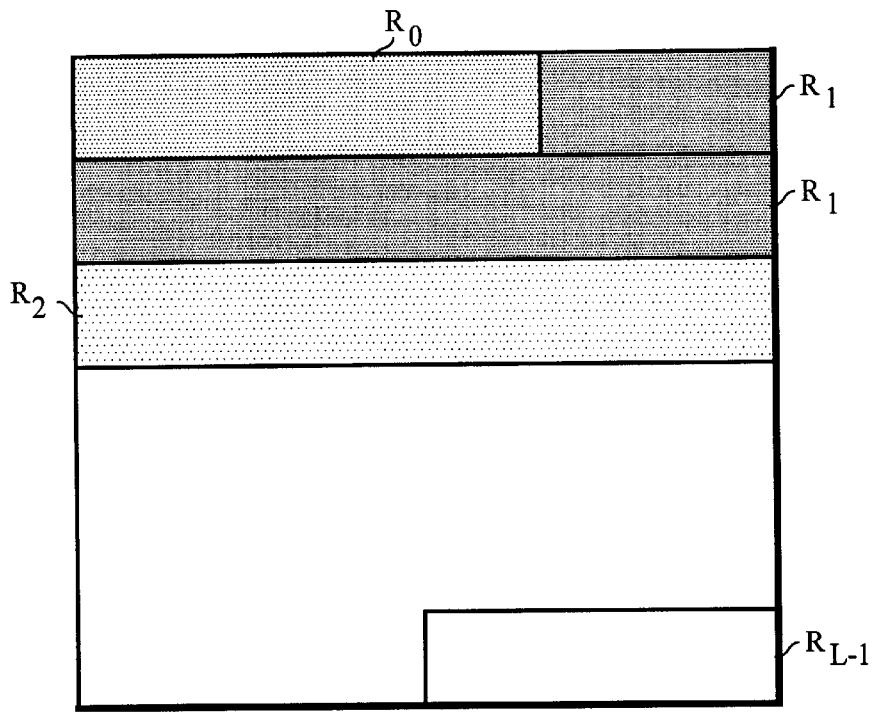
FIGS. 4, 5 and 6 illustrate use of parallelism with the invention.

Thus, an image can be decomposed into an ordered sequence $\{R_i\}_i$ (i=0, 1, 2, . . . , L−1) of two or more regions, as illustrated in one approach in FIG. 4, and the regions can be coded in parallel. The only condition imposed on partitioning the image into two or more regions is that all blocks assigned to a region $R_i$ should occur after all blocks in a preceding region assigned to a region $R_{i-j}$ (j≧1) in the sequence, when a scan is performed in a left-to-right and top-to-bottom scanning order (referred to herein as a scanning order pattern).

Figure 5:
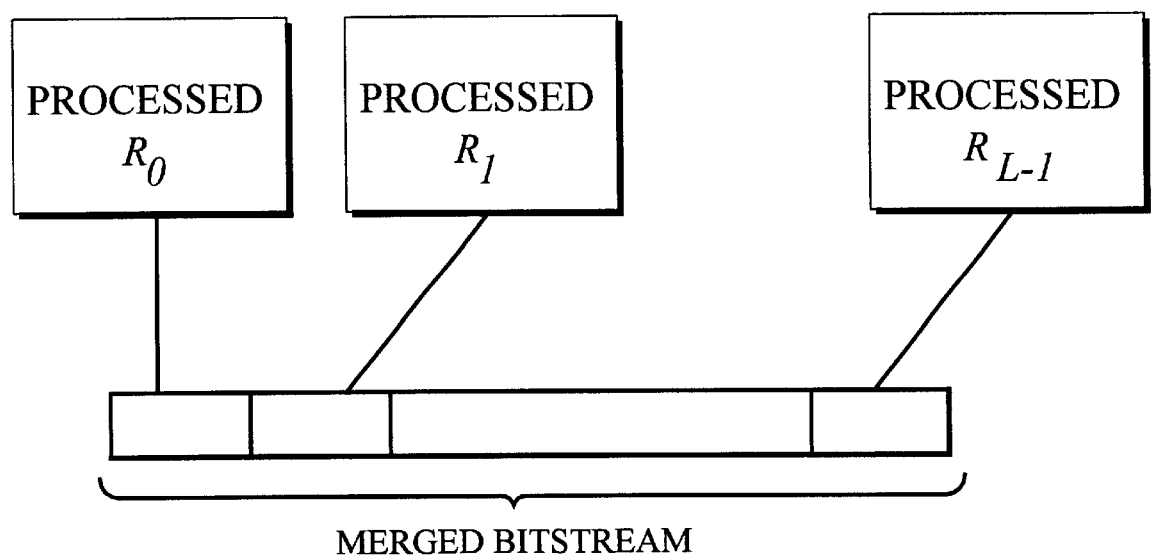

One approach for performing this decomposition into regions is to split the image into multiple horizontal rows of blocks, where the individual regions $R_i$ can be coded simultaneously using multiprocessing software or specialized hardware. Because the coding is performed in parallel, the processing of each block can be performed at a lower clock frequency, with lower power requirements, while maintaining high throughput. After the parallel coding is completed, the L processed (or compressed) bitstreams are merged in a straightforward operation, as illustrated in FIG. 5.

A second level of parallelism is available by splitting an encoder into two sets of operations: (1) predictor selection and MGC index selection and (2) entropy coding. Each of these operations can be pipelined to further improve the computation performance.

A third level of parallelism takes advantage of the fact that predictor selection and MGC selection involve similarly structured computations. Predictor selection, for example, requires that the residuals for different predictor choices be computed, using a common metric. Calculation of the metrics for different predictors can be done in parallel. A choice of the predictor with smallest residual is straightforward, after a metric is chosen.

Figure 6:
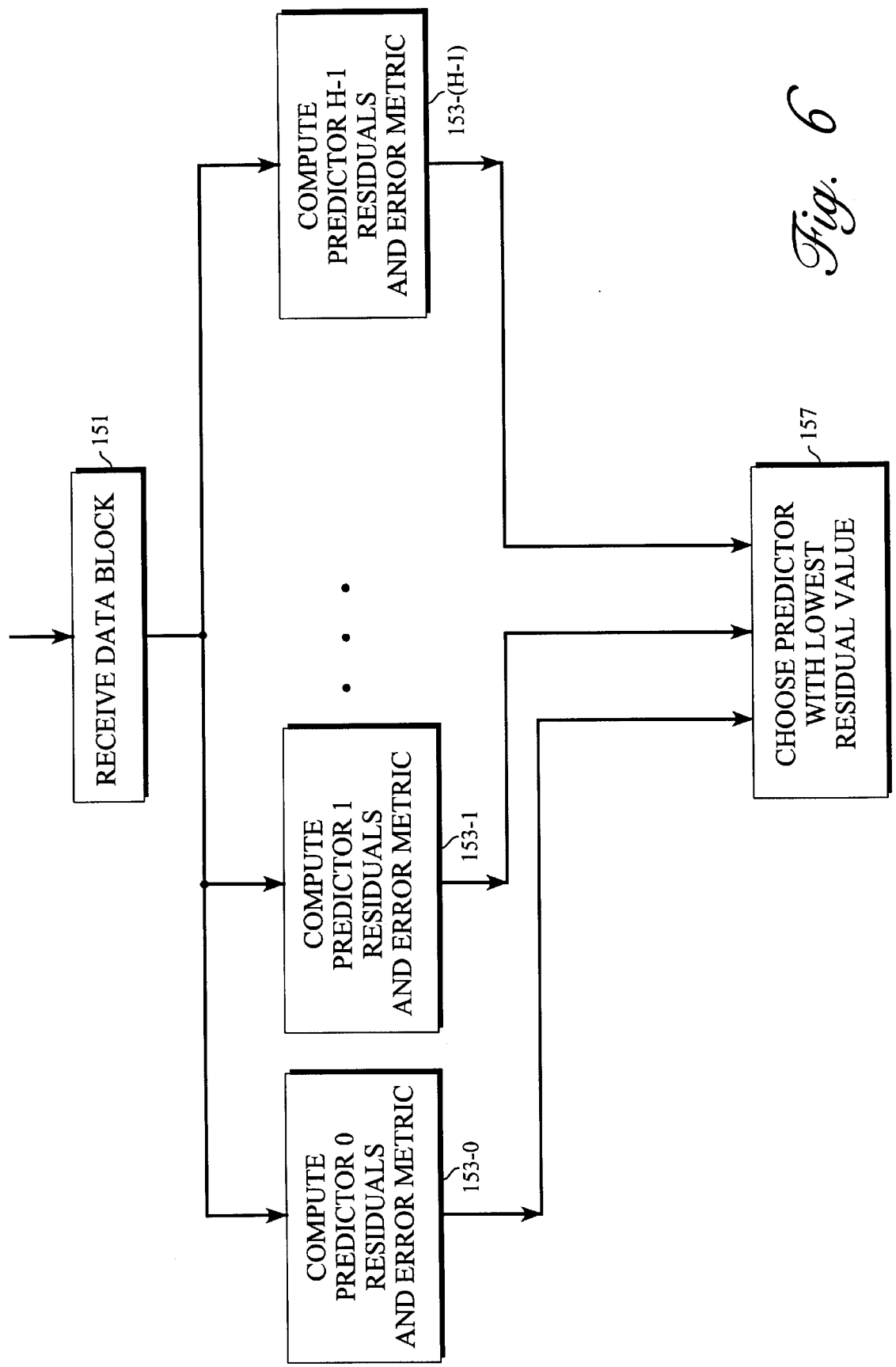

FIG. 6 illustrates an implementation of this level of parallelism. A block of pixel values is received at H different predictor analyzers, numbered h=0, 1, . . . , H−1, in a first step 151. In step 153, each predictor analyzer computes a corresponding prediction error residual values for all the pixels in the block. The errors for each of the H analyzers are pooled and compared in step 155, using an appropriate error metric, such as sum of squares, or sum of absolute values, of,the errors. The predictor with the lowest metric (including application of a tie breaker algorithm, if necessary) is chosen for the next stage or block, as part of step 155. Each of the predictor analyzers can be operated independently and in parallel to maximize system performance and/or to minimize the time required for preparing a compressed image.

The predictor calculations themselves indicate some degree of parallelism, with similar computations being performed for each pixel in the image. This parallelism can be exploited in a single instruction, multiple data (SIMD) approach as a sequence of software instructions or as a special hardware block. Use of SIMD instructions has become commonplace in microprocessors today; for example VIS on SPARC, MMX and SSE on x86, Altivec on PowerPC, MAX on PARISC, and 3DNow! on AMD, and on digital signal processors.

Figure 8:
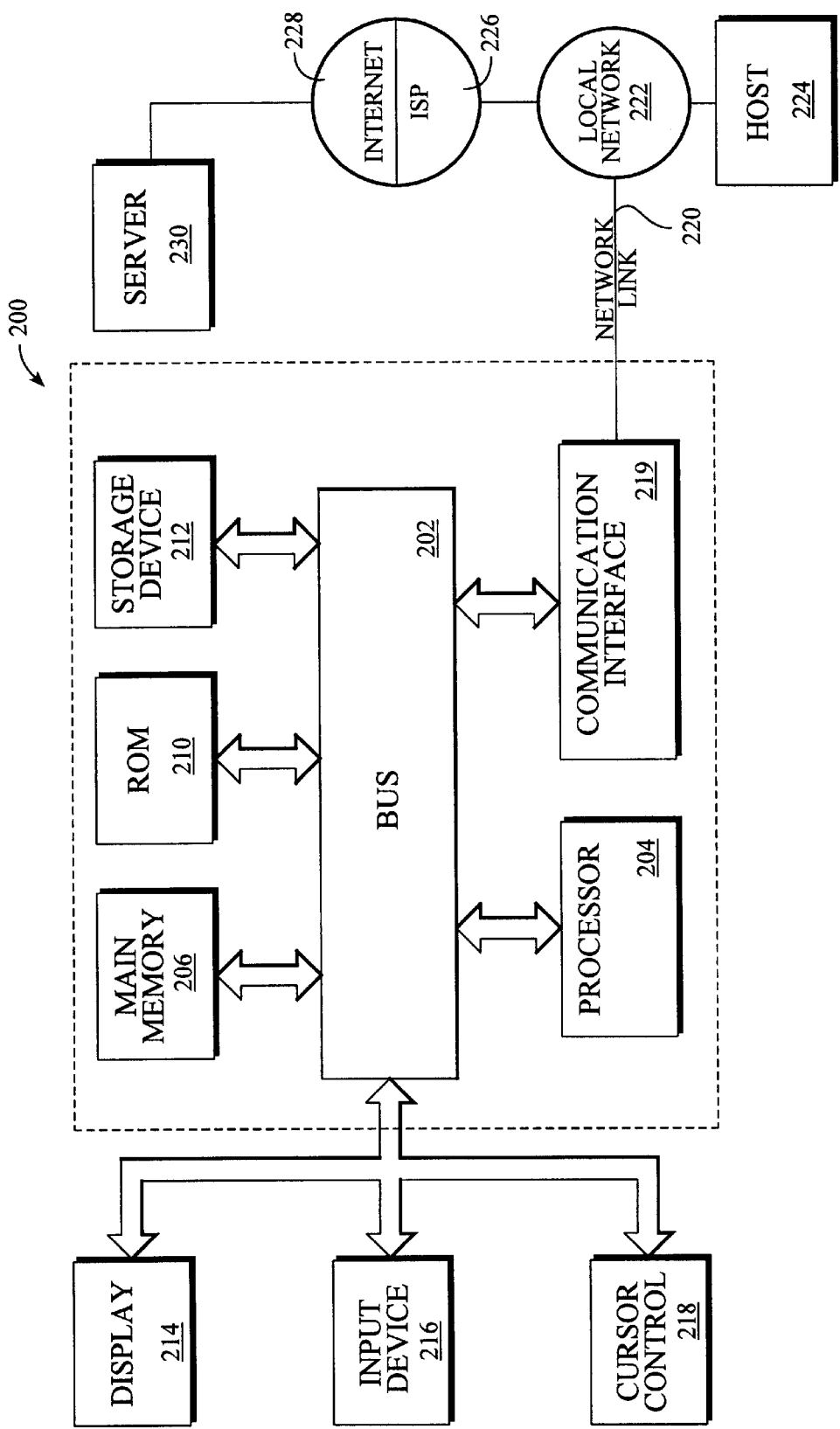

FIG. 8 shows a block diagram of a general computer system 200, which may be used to implement various hardware components of the invention, such as a client an applications server and a database management system. The computer system 200 includes a bus 208 or other communication mechanism for communicating information and a processor 210, coupled with the bus 208, for processing information. The computer system 200 also includes a main memory 212, such as a random access memory (RAM) or other dynamic storage device, coupled to the bus 208, for storing information and instructions to be executed by the processor 210. The main memory 212 also may be used for storing temporary variables or other intermediate information during execution of instructions by the processor 210. The computer system 200 further optionally includes read only memory (ROM) 214 or other static storage device, coupled to the bus 208, for storing static information and instructions for the processor 210. A storage device 216, such as a magnetic disk or optical disk, is provided and is coupled to the bus 208 for storing information and instructions.

The computer system 200 may also be coupled through the bus to a display 218, such as a cathode ray tube (CRT), for displaying information to a computer user. An input device 220, including alphanumeric and other keys, is coupled to the bus for communicating information and commands to the processor 210. Another type of user input device is a cursor control 222, such as a mouse, a trackball or cursor direction keys for communicating direction information and command selections to the processor 210 and for controlling cursor movement on the display 218. This input device typically has one degree of freedom in each of two axes, such as x- and y-axes, that allows the device to specify locations in a plane.

The functionality of the invention is provided by the computer system 200 in response to the processor 210 executing one or more sequences of instructions contained in main memory 212. These instructions may be read into main memory 212 from another computer-readable medium, such as a storage device 216. Execution of the sequences of instructions contained in the main memory 212 causes the processor 210 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 210 for execution. This medium may take many forms, including but not limited to non-volatile media, volatile media and transmission media. Non-volatile media includes, for example, optical and magnetic disks, such as the storage disks 216. Volatile media includes dynamic memory 212. Transmission media includes coaxial cables, copper wire and fiber optics and includes the wires that are part of the bus 208. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, papertape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

Various forms of computer-readable media may be involved in carrying out one or more sequences of one or more instructions to the processor 210 for execution. For example, the instructions may initially be carried on a magnetic disk of a remote computer. The remote computer can load the instructions into its dynamic memory and send the instructions over a telephone, using a modem. A modem local to the computer system 200 can receive data over a telephone line and use infrared transmitter to convert and transmit the data to the an infrared detector connected to the computer system bus. The bus will carry the data to the main memory 212, from which the processor receives and executes the instructions. Optionally, the instructions receive by the main memory 212 can be stored on the storage device 216, either before or after execution by the processor 210.

The computer system 200 also includes a communications interface 224, coupled to the bus 208, which provides two-way data communication coupling to a network link 226 that is connected to a local area network (LAN) or to a wide area network (WAN). For example, the communications interface 224 may be an integrated services digital network (ISDN) card or a modem to provide a data communication connection to a corresponding type of telephone line. As another example, the communications interface 224 may be a local area network card to provide a data communication connection to a compatible LAN. Wireless links may also be implemented. In any such implementation, the communications interface 224 sends and receives electrical, electromagnetic or optical signals that carry digital data streams representing various types of information.

The network link 226 typically provides data communication through one or more networks to other data devices. For example, the data link 226 may provide a connection through an LAN 228 to a host computer 230 or to data equipment operated by an Internet Service Provider (ISP) 232. The ISP, in turn, provides data communication services through the world wide packet data communication network, now commonly known as the "Internet" 234, served by one or more servers 236. The LAN 228 and the Internet 234 both use electrical, electromagnetic and/or optical signals to carry the digital data streams. The signals carried by these network, the signals carried on the network link 226 and the signals carried on the communications interface 224, are examples of carrier waves that transport the information.

What is claimed is:

1. A method for coding of a video image, the method comprising:

providing a data block representing pixel values for at least part of a digital image for each of at least a present frame and an adjacent frame;

determining if the pixel values of the present frame data block are the same as the pixel values of the same data block for the adjacent frame;

when the pixel values for the present frame data block are the same as the pixel values for the same data block for the adjacent frame, providing a predictor coefficient indicating that the present frame data block pixel values are predictable from the adjacent frame data block pixel values;

when at least one of the pixel values for the present frame data block is not the same as a corresponding pixel value for the same data block for the adjacent frame, determining if all pixels for the present frame data block have the same value, and:

when all pixels for the present frame data block have the same value, providing a dc predictor coefficient representing a constant pixel value for all pixels in the data block; and when at least two pixels for the present frame data block have different values, providing a selected set of non-dc predictor coefficients;

using the predictor coefficients to determine a predicted pixel value for each pixel in the present frame data block;

forming and issuing a difference value between pixel value and predicted pixel value for each pixel in the present frame data block;

receiving the pixel values, the predicted pixel values and the difference values, and forming and issuing a block of compressed values representing the pixel values for the present frame data block; and choosing said set of non-dc predictor coefficients for said selected frame to have an algebraic sum of 1.

2. A method for coding of a video image the method comprising:

providing a data block representing pixel values for at least part of a digital image for each of at least a present frame and an adjacent frame;

determining if the pixel values of the present frame data block are the same as the pixel values of the same data block for the adjacent frame;

when the pixel values for the present frame data block are the same as the pixel values for the same data block for the adjacent frame, providing a predictor coefficient indicating that the present frame data block pixel values are predictable from the adjacent frame data block pixel values;

when at least one of the pixel values for the present frame data block is not the same as a corresponding pixel value for the same data block for the adjacent frame, determining if all pixels for the present frame data block have the same value, and:

when all pixels for the present frame data block have the same value, providing a dc predictor coefficient representing a constant pixel value for all pixels in the data block; and when at least two pixels for the present frame data block have different values, providing a selected set of non-dc predictor coefficients;

using the predictor coefficients to determine a predicted pixel value for each pixel in the present frame data block;

forming and issuing a difference value between pixel value and predicted pixel value for each pixel in the present frame data block;

receiving the pixel values, the predicted pixel values and the difference values, and forming and issuing a block of compressed values representing the pixel values for the present frame data block;

expressing said present frame data block pixel value as one of at most $2^k$ binary values, where k is a selected non-negative integer; and limiting said difference value to a selected range by providing a 1-1 mapping from a set of said difference values to a set of at most $2^k$ consecutive values for said present frame.

3. A method for coding of an image, the method comprising:

providing a data block representing pixel values for at least part of a digital image for each of at least a present frame and an adjacent frame;

determining if the pixel values of the present frame data block are the same as the pixel values of the same data block for the adjacent frame;

when the pixel values for the present frame data block are the same as the pixel values for the same data block for the adjacent frame, providing a predictor coefficient indicating that the present frame data block pixel values are predictable from the adjacent frame data block pixel values;

when at least one of the pixel values for the present frame data block is not the same as a corresponding pixel value for the same data block for the adjacent frame, determining if all pixels for the present frame data block have the same value, and:

when all pixels for the present frame data block have the same value, providing a dc predictor coefficient representing a constant pixel value for all pixels in the data block; and when at least two pixels for the present frame data block have different values, providing a selected set of intra-frame non-dc predictor coefficients;

using the predictor coefficients to determine a predicted pixel value for each pixel in the present frame data block;

forming and issuing a difference value between pixel value and predicted pixel value for each pixel in the present frame data block;

limiting each difference value predicted by said non-dc predictor coefficients to a selected range of values having a selected maximum value;

computing a product value, equal to twice the predicted value, and a difference value, equal to the difference between the provided value and the predicted value, for at least one number in the present frame data block;

when the provided value is no greater than the predicted value, and the product value is no greater than the sum of the provided value plus the maximum value, computing a value index equal to twice the difference value;

when the provided value is no greater than the predicted value, and the product value is greater than the sum of the provided value plus the maximum value, computing a value index equal to the maximum value minus the provided value;

when the provided value is greater than the predicted value, and the product value is less than the provided value, computing a value index equal to the provided value;

when the provided value is greater than the predicted value, and the product value is at least equal to the provided value, computing a value index equal to twice the difference value minus 1; and representing the binary value for the at least one number in the present frame data block.

4. The method of claim 3, further comprising choosing said selected set of non-dc predictor coefficients so that at least one of said present frame data block pixel values is predicted by a linear combination of values of N pixels that are contiguous to said pixel in said present frame, where $N \geq 2$.

5. The method of claim 3, further comprising choosing said selected set of non-dc predictor coefficients so that at least one of said present frame data block pixel values includes at least one value of a pixel, in said adjacent frame, that is related to a pixel in said present frame data block by a motion vector.

6. The method of claim 3, further comprising choosing said set of non-dc predictor coefficients for said selected frame to have an algebraic sum of 1.

7. The method of claim 3, further comprising:

expressing said present frame data block pixel value as one of at most $2^k$ binary values, where k is a selected non-negative integer; and limiting said difference value to a selected range by providing a 1-1 mapping from a set of said difference values to a set of at most $2^k$ consecutive values for said present frame.

8. A system for coding of an image, the system comprising:

a data block processor that received and analyzes a data block of pixel values for at least part of a digital image for at least a present frame and an adjacent frame, determines if the pixel values of the present frame data block are the same as the pixel values of the same data block for the adjacent frame, and, when the pixel values of the present frame data block are the same as the pixel values of the same data block for the adjacent frame, provides a predictor coefficient indicating that the present frame data block pixel values are predictable from the adjacent frame data block pixel values;

a predictor choice mechanism that receives the present frame data block when the pixel values of the present frame data block are not all the same as the pixel values of the same data block for the adjacent frame and that (1) when all values in the present frame data block are the same, provides a dc predictor coefficient representing a constant pixel value for all pixels in the present frame data block, and (2) when at least two values in the present frame data block are not the same, provides a selected set of non-dc predictor coefficients and provides predicted values for the pixels in the data block;

a predictor mechanism that uses the predictor coefficients to determine a predicted pixel value for each pixel in the present frame data block;

a difference mechanism that forms and issues a difference between pixel value and predicted pixel value for each pixel in the present frame data block; and a coding mechanism that receives the pixel values, the predicted pixel values and the difference values, and forms and issues a block of compressed values of pixel value differences for the present frame data block;

wherein said non-dc predictor coefficients for said present frame are chosen to have an algebraic sum of 1.

9. A system for coding of an image, the system comprising:

a data block processor that received and analyzes a data block of pixel values for at least part of a digital image for at least a present frame and an adjacent frame, determines if the pixel values of the present frame data block are the same as the pixel values of the same data block for the adjacent frame, and, when the pixel values of the present frame data block are the same as the pixel values of the same data block for the adjacent frame, provides a predictor coefficient indicating that the present frame data block pixel values are predictable from the adjacent frame data block pixel values;

a predictor choice mechanism that receives the present frame data block when the pixel values of the present frame data block are not all the same as the pixel values of the same data block for the adjacent frame and that (1) when all values in the present frame data block are the same, provides a dc predictor coefficient representing a constant pixel value for all pixels in the present frame data block, and (2) when at least two values in the present frame data block are not the same, provides a selected set of non-dc predictor coefficients and provides predicted values for the pixels in the data block;

a predictor mechanism that uses the predictor coefficients to determine a predicted pixel value for each pixel in the present frame data block;

a difference mechanism that forms and issues a difference between pixel value and predicted pixel value for each pixel in the present frame data block; and a coding mechanism that receives the pixel values, the predicted pixel values and the difference values, and forms and issues a block of compressed values of pixel value differences for the present frame data block;

wherein at least one of said predictor choice mechanism, said difference mechanism and said coding mechanism (i) expresses a pixel value as one of at most $2^k$ values, where k is a selected non-negative integer and (ii) limits said pixel difference value to a selected range of difference values by providing a 1-1 mapping from a set of said difference values to a set of at most $2^k$ consecutive values for said present frame.

10. A system for coding of a video image, the system comprising a computer that is programmed:

to provide a data block representing pixel values for at least part of a digital image for each of at least a present frame and an adjacent frame;

to determine if the pixel values of the present frame data block are the same as the pixel values of the same data block for the adjacent frame;

when the pixel values for the present frame data block are the same as the pixel values for the same data block for the adjacent frame, to provide a predictor coefficient indicating that the present frame data block pixel values are predictable from the adjacent frame data block pixel values;

when at least one of the pixel values for the present frame data block is not the same as a corresponding pixel value for the same data block for the adjacent frame, to determine if all pixels for the present frame data block have the same value, and:

when all pixels for the present frame data block have the same value, to provide a dc predictor coefficient representing a constant pixel value for all pixels in the present frame data block; and when at least two pixels for the present frame data block have different values, to provide a selected set of non-dc predictor coefficients;

to use the predictor coefficients to determine a predicted pixel value for each pixel in the present frame data block;

to form and issue a difference value between pixel value and predicted pixel value for each pixel in the present frame data block; and to receive the pixel values, the predicted pixel values and the difference values, and to form and issue a block of compressed values representing the pixel values for the present frame data block;

wherein said computer is further programmed to choose said set of non-dc predictor coefficients for said selected frame to have an algebraic sum of 1.

11. A system for coding of a video image, the system comprising a computer that is programmed:

to provide a data block representing pixel values for at least part of a digital image for each of at least a present frame and an adjacent frame;

to determine if the pixel values of the present frame data block are the same as the pixel values of the same data block for the adjacent frame;

when the pixel values for the present frame data block are the same as the pixel values for the same data block for the adjacent frame, to provide a predictor coefficient indicating that the present frame data block pixel values are predictable from the adjacent frame data block pixel values;

when at least one of the pixel values for the present frame data block is not the same as a corresponding pixel value for the same data block for the adjacent frame, to determine if all pixels for the present frame data block have the same value, and:

when all pixels for the present frame data block have the same value, to provide a dc predictor coefficient representing a constant pixel value for all pixels in the present frame data block; and when at least two pixels for the present frame data block have different values, to provide a selected set of non-dc predictor coefficients;

to use the predictor coefficients to determine a predicted pixel value for each pixel in the present frame data block;

to form and issue a difference value between pixel value and predicted pixel value for each pixel in the present frame data block;

to receive the pixel values, the predicted pixel values and the difference values, and to form and issue a block of compressed values representing the pixel values for the present frame data block;

to express said present frame data block pixel value as one of at most $2^k$ binary values, where k is a selected non-negative integer; and to limit said difference value to a selected range by providing a 1-1 mapping from a set of said difference values to a set of at most $2^k$ consecutive values for said present frame.

12. A system for coding of an image, the system comprising a computer that is programmed:

to provide a data block representing pixel values for at least part of a digital image for each of at least a present frame and an adjacent frame;

to determine if the pixel values of the present frame data block are the same as the pixel values of the same data block for the adjacent frame;

when the pixel values for the present frame data block are the same as the pixel values for the same data block for the adjacent frame, to provide a predictor coefficient indicating that the present frame data block pixel values are predictable from the adjacent frame data block pixel values;

when at least one of the pixel values for the present frame data block is not the same as a corresponding pixel value for the same data block for the adjacent frame, to determine if all pixels for the present frame data block have the same value, and:

when all pixels for the present frame data block have the same value, to provide a dc predictor coefficient representing a constant pixel value for all pixels in the data block; and when at least two pixels for the present frame data block have different values, to provide a selected set of non-dc predictor coefficients;

to use the predictor coefficients to determine a predicted pixel value for each pixel in the present frame data block;

to form and issue a difference value between pixel value and predicted pixel value for each pixel in the present frame data block;

to limit each difference value predicted by said non-dc predictor coefficients to a selected range of values having a selected maximum value;

to compute a product value, equal to twice the predicted value, and a difference value, equal to the difference between the provided value and the predicted value, for at least one number in the present frame data block;

when the provided value is no greater than the predicted value, and the product value is no greater than the sum of the provided value plus the maximum value, to compute a value index equal to twice the difference value;

when the provided value is no greater than the predicted value, and the product value is greater than the sum of the provided value plus the maximum value, to compute a value index equal to the maximum value minus the provided value;

when the provided value is greater than the predicted value, and the product value is less than the provided value, to compute a value index equal to the provided value;

when the provided value is greater than the predicted value, and the product value is at least equal to the provided value, to compute a value index equal to twice the difference value minus 1; and to represent the binary value for the at least one number in the present frame data block by the value index.

13. The system of claim 12, wherein said computer is further programmed to choose said selected set of non-dc predictor coefficients so that at least one of said present frame data block pixel values is predicted by a linear combination of values of N pixels that are contiguous to said pixel in said present frame, where N>2.

14. The system of claim 12, wherein said computer is further programmed to choose said selected set of non-dc predictor coefficients so that at least one of said present frame data block pixel values includes at least one value of a pixel, in said adjacent frame, that is related to a pixel in said present frame data block by a motion vector.

15. The system of claim 12, wherein said computer is further programmed to choose said set of non-dc predictor coefficients for said selected frame to have an algebraic sum of 1.

16. The system of claim 12, wherein said computer is further programmed:

to express said present frame data block pixel value as one of at most $2^k$ binary values, where k is a selected non-negative integer; and to limit said difference value to a selected range by providing a 1-1 mapping from a set of said difference values to a set of at most $2^k$ consecutive values for said present frame.

17. An article of manufacture for coding of an image, the article comprising a computer usable medium having computer readable code means embodied therein for providing a data block representing pixel values for at least part of a digital image for each of at least a present frame and an adjacent frame;

computer readable program code means for determining if the pixel values of the present frame data block are the same as the pixel values of the same data block for the adjacent frame;

when the pixel values for the present frame data block are the same as the pixel values for the same data block for the adjacent frame, computer readable program code means for providing a predictor coefficient indicating that the present frame data block pixel values are predictable from the adjacent frame data block pixel values;

when at least one of the pixel values for the present frame data block is not the same as a corresponding pixel value for the same data block for the adjacent frame, computer readable program code means for determining if all pixels for the present frame data block have the same value, and:

when all pixels for the present frame data block have the same value, computer readable program code means for providing a dc predictor coefficient representing a constant pixel value for all pixels in the data block; and when at least two pixels for the present frame data block have different values, computer readable program code means for providing a selected set of non-dc predictor coefficients;

computer readable program code means for using the predictor coefficients to determine a predicted pixel value for each pixel in the present frame data block;

computer readable program code means for forming and issuing a difference value between pixel value and predicted pixel value for each pixel in the present frame data block;

computer readable program code means for limiting each difference value predicted by said non-dc predictor coefficients to a selected range of values having a selected maximum value;

computer readable program code means for computing a product value, equal to twice the predicted value, and a difference value, equal to the difference between the provided value and the predicted value, for at least one number in the present frame data block;

when the provided value is no greater than the predicted value, and the product value is no greater than the sum of the provided value plus the maximum value, computer readable program code means for computing a value index equal to twice the difference value;

when the provided value is no greater than the predicted value, and the product value is greater than the sum of the provided value plus the maximum value, computer readable program code means for computing a value index equal to the maximum value minus the provided value;

when the provided value is greater than the predicted value, and the product value is less than the provided value, computer readable program code means for computing a value index equal to the provided value;

when the provided value is greater than the predicted value, and the product value is at least equal to the provided value, computer readable program code means for computing a value index equal to twice the difference value minus 1; and computer readable program code means for representing the binary value for the at least one number in the data block for the present frame data block by the value index.

\* \* \* \* \*